United States Patent [19]

Brown et al.

[11] Patent Number: 4,590,650

[45] Date of Patent: May 27, 1986

[54] ELECTRICAL HARNESS FABRICATION MACHINE

[75] Inventors: Richard L. Brown, Aurora; Daniel J. Anderson, Elmhurst; Leonard J. Lickus, Plainfield, all of Ill.

[73] Assignee: Molex Incorporated, Lisle, Ill.

[21] Appl. No.: 584,041

[22] Filed: Feb. 27, 1984

[51] Int. Cl.[4] ........................ B23P 19/00; H01R 43/04

[52] U.S. Cl. .................................. 29/33 M; 29/564.6; 29/566.3; 29/749

[58] Field of Search ...................... 29/566.3, 749, 857, 29/755, 866, 564.1, 564.4, 564.6, 33 M

[56] References Cited

U.S. PATENT DOCUMENTS

| | | | |
|---|---|---|---|
| 4,335,497 | 6/1982 | Casey | 29/566.3 X |
| 4,343,085 | 8/1982 | Lucius et al. | 29/866 |
| 4,370,806 | 2/1983 | Funcik et al. | 29/749 |
| 4,492,023 | 1/1985 | Schneider et al. | 29/749 X |

*Primary Examiner*—Z. R. Bilinsky

*Attorney, Agent, or Firm*—Louis A. Hecht

[57] ABSTRACT

An electrical harness fabrication machine which produces harnesses which comprise ribbon cable having a connector at each end. Each connector has a housing with terminals loaded therein. Prior to termination to the cable, the terminals are partially preloaded into their respective housings so that conductor engaging ends thereof are presented to a termination station for mass termination. A conductor engaging end of the terminals are free standing sections which form an insulation displacement slot therebetween. The termination assembly has a portion adjacent conductor stuffing blades for laterally supporting the conductor engaging ends of the terminals during the termination operation. In addition, pilot members are provided to cooperate with a connector nest having a preloaded connector received therein and the conductors for accurately aligning the conductors, conductor engaging ends of the terminals and the termination assembly with respect to one another.

37 Claims, 15 Drawing Figures

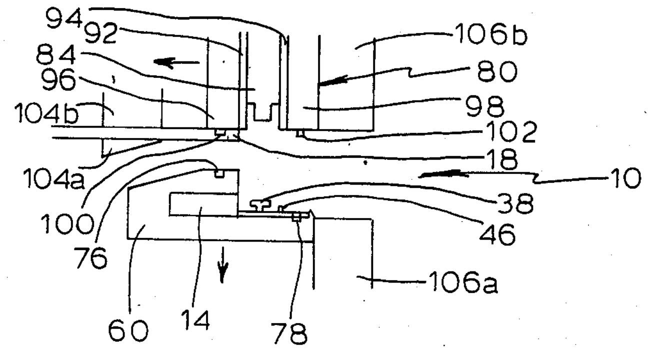
FIG 6a
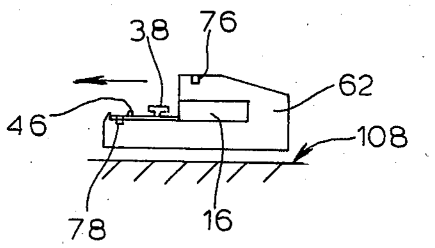
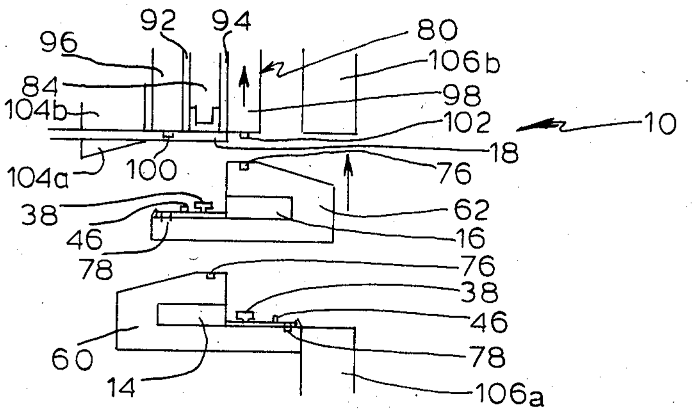
FIG. 6b
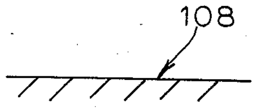
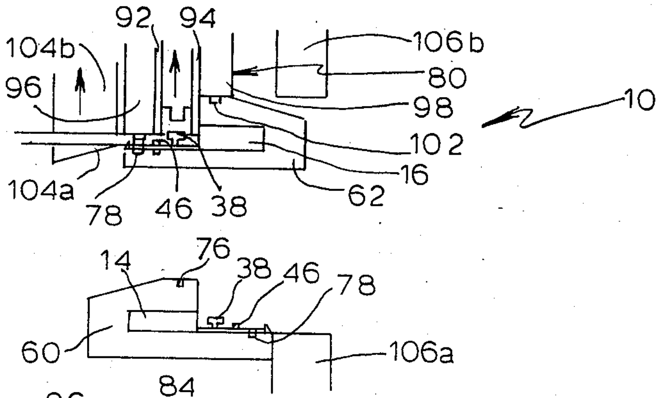
FIG. 6c
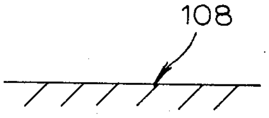
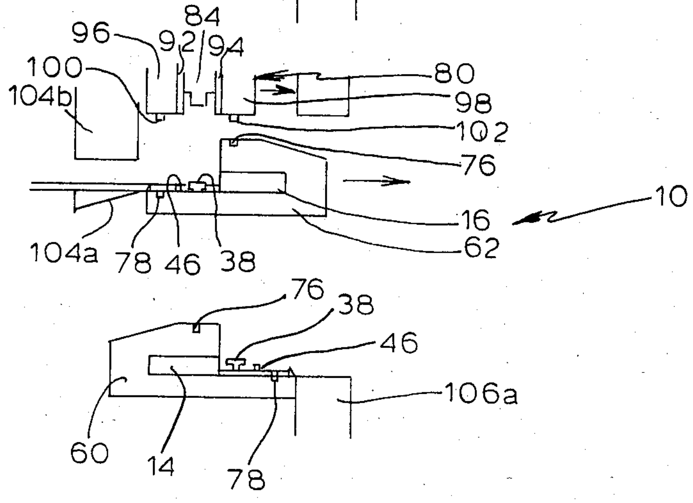
FIG. 6d
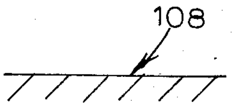

ELECTRICAL HARNESS FABRICATION MACHINE

BACKGROUND OF THE INVENTION

1. Field of the Invention

The present invention relates to machines or other apparatus for fabricating an electrical harness which comprises a plurality of wire conductors electrically connected to one or more electrical connectors.

2. Brief Description of the Prior Art

In order to mass terminate a plurality of terminals to wire conductors, machines have been developed to partially preload the terminals into the terminal receiving cavities of a connector housing so that their wire engaging portions extend from the housing. Subsequently, a termination assembly of suitable configuration electrically connects or terminates the wire conductors to the wire engaging portions of the terminal. The partially loaded terminals are then inserted completely into their fully seated position into the connector housing.

An example of the above apparatus is disclosed in U.S. Pat. No. 4,335,497. This particular patent shows a termination station whereat one such connector is terminated.

Co-pending U.S. patent application Ser. No. 579,731, owned by the Assignee of the present invention, discloses a mass termination type machine which fabricates double ended electrical harnesses. The electrical harness comprises a plurality of wire conductors having a connector electrically attached to both ends.

One type of terminal which can be used for mass termination is a crimpable insulation piercing type which is disclosed in the above-identified U.S. Pat. No. 4,335,497. Another type of terminal which leads itself to mass termination is one having a wire engaging portion that has an insulation displacement slot. One form of an insulation displacement slot is disclosed in U.S. Pat. No. 4,385,794. The problem with such a terminal design is that the insulation displacement slot is formed from free standing walls. When the wire conductor is being inserted into the insulation displacement slot, the free standing walls comprising the slot tend to move away from one another thereby lessening the reliability of the electrical connection between the conductor core and the terminal.

One means of supporting an insulation displacement type terminal during termination is disclosed in U.S. Pat. No. 4,277,124. The terminal is braced by walls formed in the connector housing. This requires a two piece housing design.

A common problem encountered in mass terminating a plurality of terminals is to properly align the wire conductors with the corresponding conductor engaging portions of the terminals. One machine is disclosed in U.S. Pat. No. 4,290,179 which attempts to solve this problem.

SUMMARY OF THE INVENTION

One object of the present invention to provide a machine for fabricating electrical harness which includes a connector electrically connected to a plurality of conductors. The connector has a housing with a plurality of terminal receiving cavities therein in a plurality of terminals mounted in said cavities, each terminal having a conductor engaging portion and being moveable between a partially preloaded position relative to the housing wherein the conductor engaging portions extend out of the housing to an inserted position wherein the terminals are fully seated within their respective cavities. The machine includes a connector nest for holding and positioning a partially preloaded connector having a floor defining a support surface for said connector, a termination station whereat a partially preloaded connector is electrically connected to a plurality of conductors, a conductor source for storing conductors and guiding them to the termination station, wire clamping means for releasably holding the conductors at the termination station, a termination assembly including a termination head for simultaneously attaching the conductors to the terminal conductor engaging portions, said connector nest and termination assembly being mounted for up and down relative movement between a first position wherein said nest a spaced from said termination assembly and a second position wherein said conductors and conductor engaging portions are terminated, means for feeding a predetermined length of conductors, cutting means for cutting the conductors at the predetermined length after being terminated, and terminal insertion means for inserting the terminals to their inserted position. The improvement comprising the invention is characterized in that said termination assembly including pilot means adjacent said head and cooperating with said wire conductors and nest for accurately positioning the termination head, conductors and conductor engaging portions with respect to one another when the nest and termination assembly are in their second position.

It is a second object of the present invention to provide a machine for fabricating electrical harness which includes a connector electrically connected to a plurality of insulated wire conductors. The conductor and machine are as described above except that the wire engaging portions of the terminal are insulation displacement slots and the termination head has plurality of wire stuffing blades and is moveable between a normal position wherein the blades are immediately over the wire conductors and wire slots downwardly to a terminating position simultaneously pushing the wire conductors into their respective wire slots. The improvement comprising the invention is characterized in that said wire engaging portion including a base with two upstanding opposed C-shaped members each having a wall defining the bight, parallel and spaced from each other, each wall having an inwardly directed plate at both ends, the plates at each same end of the walls being spaced apart a distance less than the conductor of the insulated wire so as to define two axially spaced insulation displacement slots; and said termination head including wall support means mounted on both sides of each blade, and a space between each blade and wall support means for receiving a terminal wall therein so that the wall support means are positioned immediately adjacent the outside of the terminal walls when said termination head is in the terminating position;

whereby, when said termination head is moved to its terminating position, the wall support means laterally brace the terminal walls to prevent the terminals from moving outwardly away from each other.

A third object of the present invention is to provide a machine of the type described above for fabricating electrical harness which includes first and second connectors, one connector electrically connected to each end of plurality of conductors. The connector and machine are as described above except that the machine includes a second connector nest facing the first connector nest, a second station remote from said termination station whereat the second nest is initially located, said first nest to be initially located at said termination station, and the control means for moving the second nest to the termination station, lowering the first nest so as to accommodate the second nest, moving the second nest from its first position to its second position, terminating one end of the conductors to the partially preloaded connector, moving the second nest back to the second station, pulling a length of conductors therewith, moving the first nest to its second position, terminating the other end of the conductors to the first partially preloaded connector and cutting the conductors during termination of the first connector. The improvement which comprises the invention is characterized in that said termination assembly including the first and second pilot means on either side of said head and separately cooperating at each end of said conductors in each nest individually for accurately positioning the termination head, conductors and conductor engaging portions with respect to one another when each nest and the termination assembly are in the second position.

A fourth object of the present invention is to provide a new and improved termination head for moving an insulated conductor into an insulation displacement slot of an electrical terminal. The terminal includes insulation displacement slot means formed between two slot forming sections spaced apart a distance less than the width of the conductor. The termination head includes a blade for engaging a conductor, said head being moveable between a first position wherein the blade is spaced from said conductor and slot means downwardly to a second terminating position wherein said blade pushes the conductor into the slot means, said slot means displacing the insulation to electrically contact the conductor. The improvement which comprises the invention in characterized in that said termination head including terminal support means on both sides of said blade so that the support means are positioned immediately adjacent the outside of the sections when the head is in the second position, whereby the support means laterally brace the sections to prevent outward movement away from each other.

BRIEF DESCRIPTION OF THE DRAWINGS

FIGS. 6A–6H are schematic views showing the operation of portion of the machine of the present invention.

DESCRIPTION OF THE PREFERRED EMBODIMENT

Figure 1:
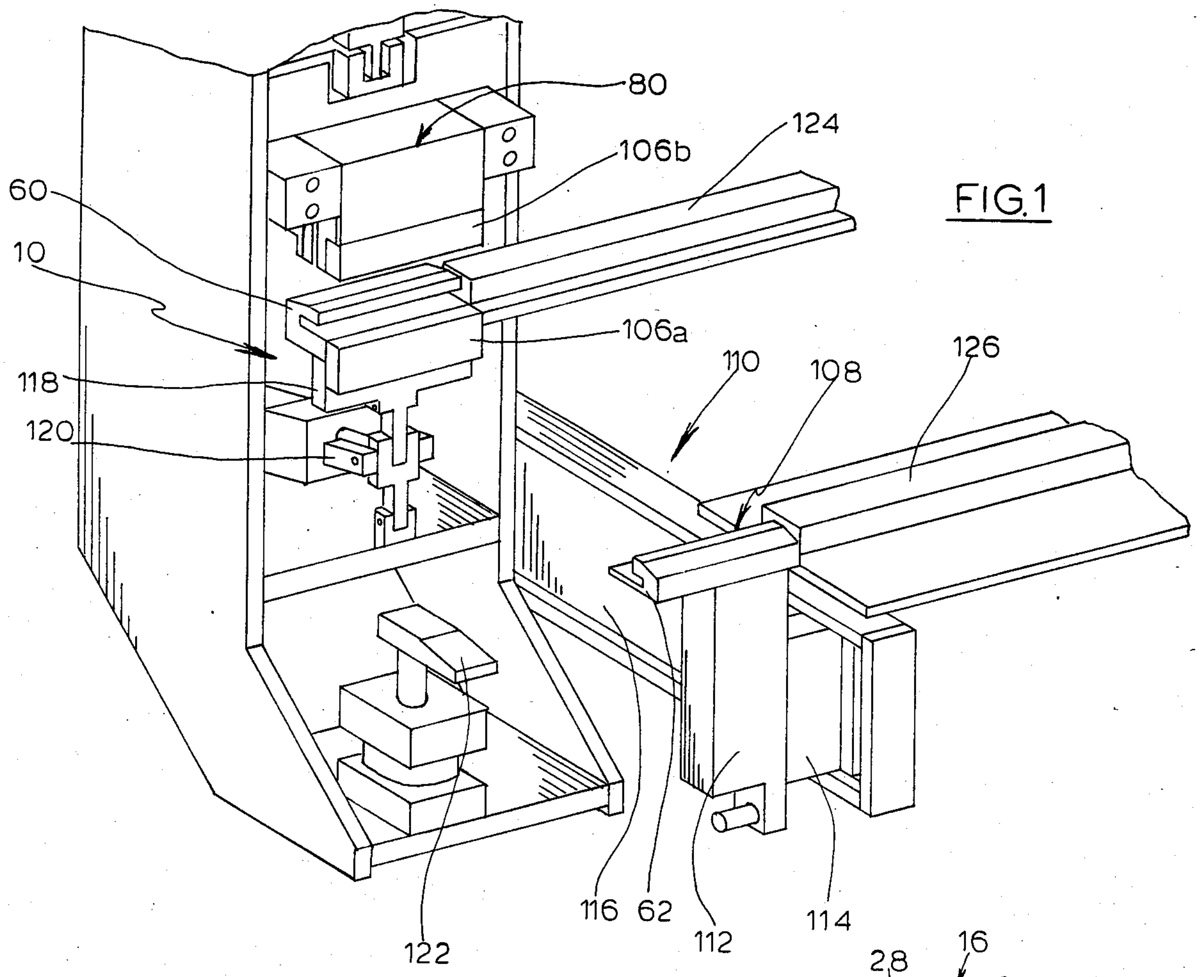
FIG. 1 is a perspective view of the termination station of the machine of the present invention.

Turning now to the drawings, a portion of the machine of the present invention is shown in FIG. 1. In particular, FIG. 1 illustrates the termination station, generally designated 10, whereat an electrical harness is partially fabricated.

Figure 2:
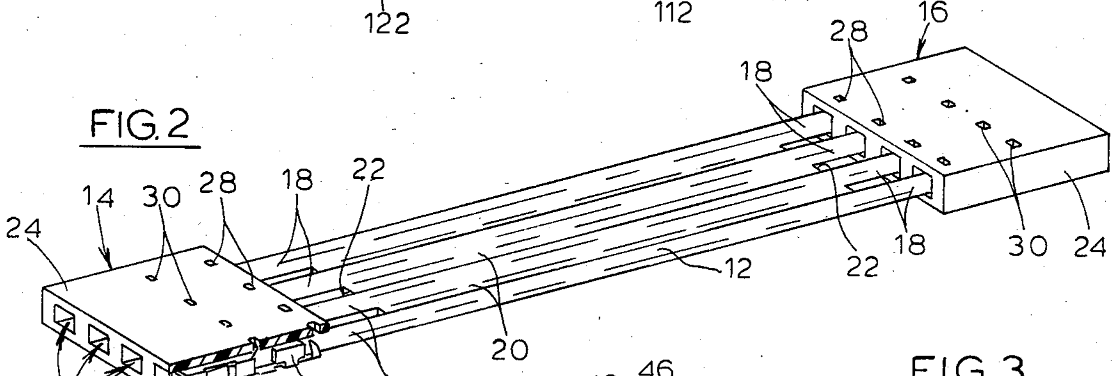
FIG. 2 is a perspective view, partially in section, of a completed electrical harness fabricated by the machine of the present invention.

The electrical harnesses produced by the machine are of the type which is shown in FIG. 2 and is seen to generally include a length of round conductor ribbon cable 12 having electrically connected at either end a first connector, generally designated 14, and a second connector generally designated 16. The ribbon cable 12 has a plurality of parallel side by side insulated wire conductors 18 mechanically held together by insulative webs 20. Portions of the webs 20 are removed to form notches 22 in a manner that is well known in the art. It is to be understood that other types of conductors can be used such as a flat conductor ribbon cable or discrete wire.

I. THE CONNECTOR

Figure 3:
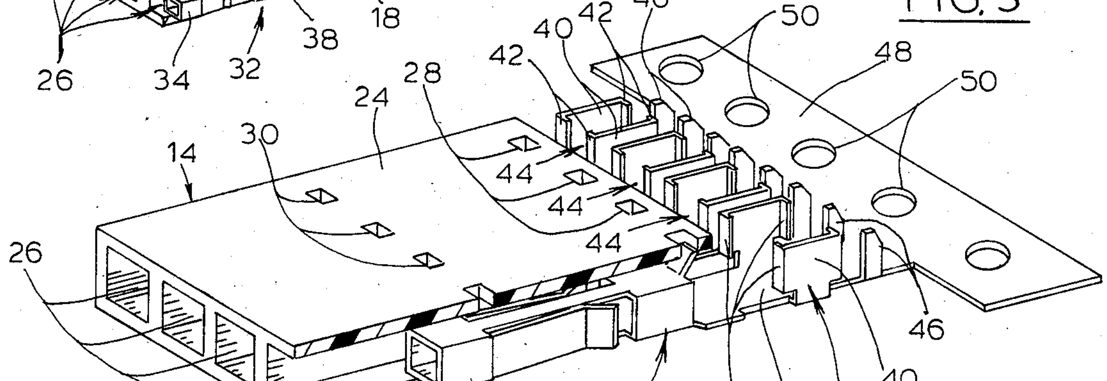
FIG. 3 is a perspective view, partially in section, of a partially preloaded connector used in fabricating the electrical harness shown in FIG. 2.

Looking at FIGS. 2 and 3, each connector 14 and 16 is seen to generally include an insulated housing 24 having several side by side terminal receiving cavities 26. Each cavity 26 has two windows 28 and 30 axially spaced from one another for purposes which will become more apparent hereinafter.

A plurality of terminals 32 are received on cavities 26. Each terminal 32 has a pin receiving end 34 although, it is understood, that the end 34 disclosed herein does not have to be in the configuration illustrated in the drawings. Integrally formed with the pin receiving end 34 is a wire or conductor engaging end which generally includes a base 36 having two upstanding opposed C-shaped conductor engaging members 38. Each C-shaped member 38 has a wall defining a bight and an inwardly directed plate 42 at both ends. The plates 42 at each same end of both walls 40 are spaced apart a distance less than the conductor of the insulated wires so as to define two axially spaced insulation displacement slots 44. Slots 44 are adapted to receive an insulated wire conductor 18 therein and displace the insulation to contact conductor core.

Looking at FIG. 3, the terminal 32 also includes integrally formed crimpable strain relief wings 46 which extend upwardly from either side of base 36 immediately adjacent the C-shaped members 38. Wings 46 are adapted to be crimped around the insulation of the wire conductor 18 when it is received within the slots 44 for the purpose of preventing inadvertent axial pullout of the wire from the terminal 32.

It has been found to be advantageous to present the wire engaging ends of terminals 32 outside of the housing 24. Thus, the connectors 14 and 16 are loaded onto the machine with the terminals 32 in a preloaded, partially inserted position as shown in FIG. 3. This preloaded position is defined wherein a locking lance 48 formed on each terminal 32 cooperates with window 28.

The terminals 32 are maintained in this preloaded position and their end spacing is maintained by virtue of retaining the carrier strip 50 integrally therewith. Because of this, the terminals 32 will always move in unison while the strip 50 is attached thereto. It is also to be noted that carrier strip 50 has the usual pilot holes 52 formed therein which are normally used in the process of manufacturing terminals.

After the conductors 18 are terminated, the terminals are inserted fully into their respective cavities 26 and are held in that position by virtue of the respective locking lances 48 cooperating with windows 30. At some point subsequent to the termination, the carrier strip 50 is knocked off the remaining terminals to produce the harness shown in FIG. 2.

II. THE CONNECTOR NESTS

Each connector 14 and 16 is adapted to be held and positioned within first and second connector nests, generally designated 60 and 62, respectively. Looking at FIGS. 4A and 5A, each nest 60 and 62 is seen to generally include a floor 64 having an end wall 66 extending upwardly therefrom and a ceiling 68 parallel to floor 64 overhanging a part of the length of said floor. The area between the floor 64, end wall 66 and ceiling 68 defines a connector housing receiving recess. The ceiling 68 has a top portion which is slanted at 70 relative to the floor and flat portion 72.

Two sets of pilot recesses 76 and 78 are formed in both nests 60 and 62. One set of recesses 76 is formed in the flat portion 72 of ceiling 68. The other set of recesses 78 is formed in the floor 64 so that when the partially preloaded connector 14 or 16 is properly mounted in nest 60 and 62, the pilot holes of the carrier strip 50 are aligned with recesses 78.

III. THE TERMINATION ASSEMBLY

A termination assembly, a generally designated 80, is mounted at the termination station 10 and is moveable two in mutually perpendicular directions. In general, the termination assembly 80 is mounted for up and down movement between a first position wherein a nest 60 or 62 is spaced from said termination assembly and a second position wherein the conductors 18 are terminated within their respective insulation displacement slots 44. The termination assembly 80 is also moveable towards and away from the conductor source (not shown).

The termination assembly 80 serves the purpose of positioning the ends 18 of a length of cable 12 relative to the insulation displacement slots 44 and terminating the ends into the slots. As will become apparent hereinafter, termination assembly 80 performs the same function with respect to both connectors 14 and 16 which are received in the respective nests 60 and 62 without altering the level at which the cable conductors 18 are held at the termination assembly 80.

Figure 4A:
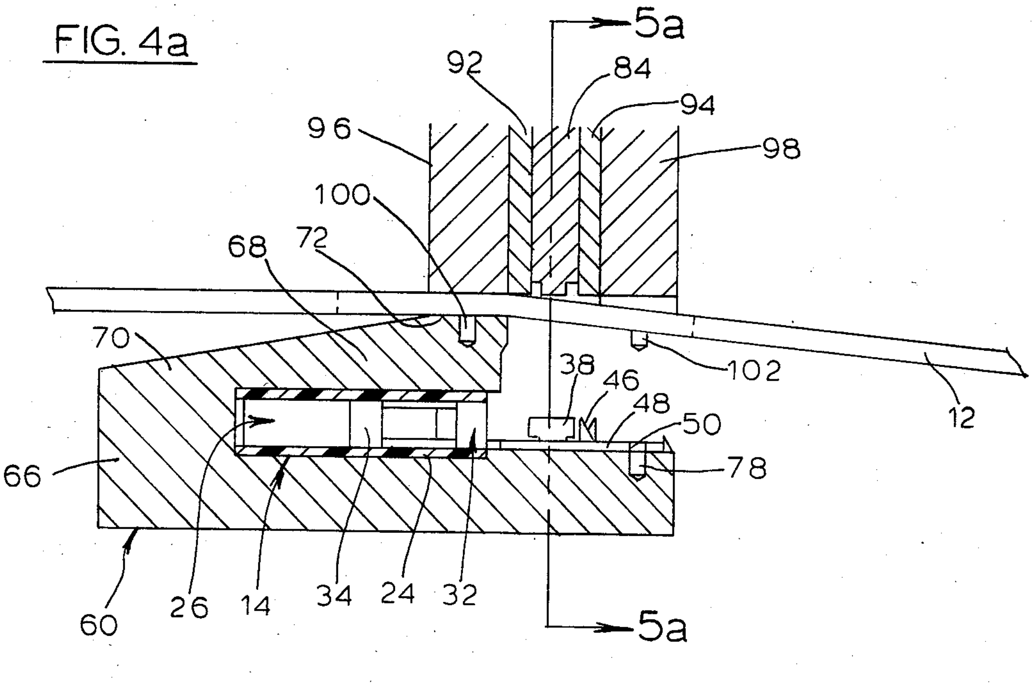
FIG. 4A is a side sectional view of the termination station of the machine of the present invention prior to termination.
Figure 4B:
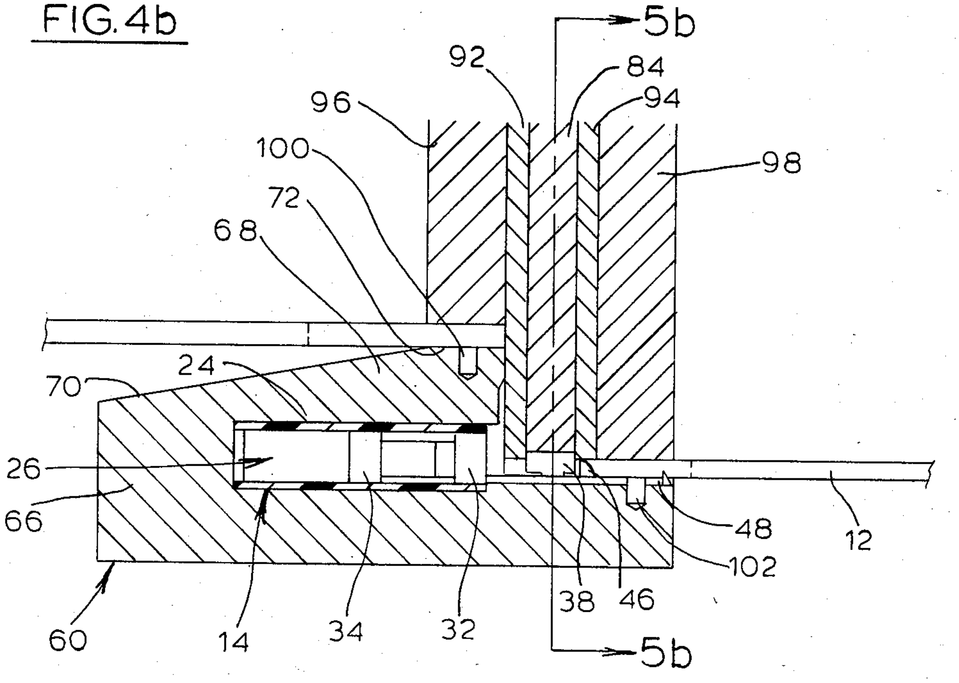
FIG. 4B is a side sectional view of the termination station of the machine of the present invention during termination.
Figure 5A:
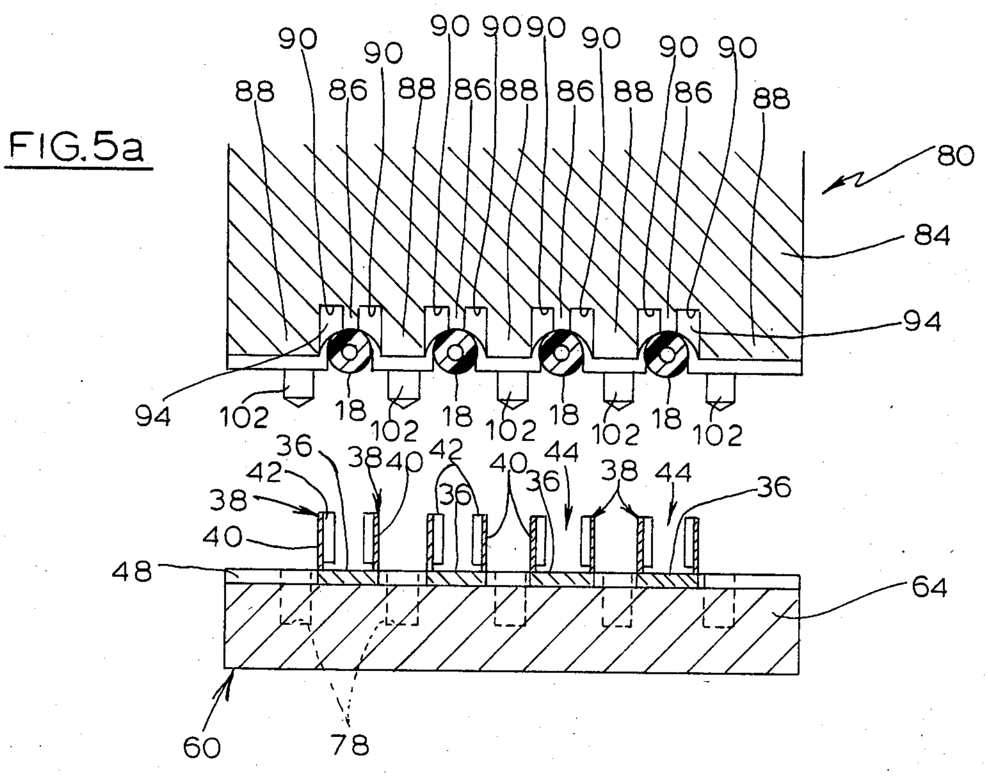
FIG. 5A is a sectional view taken generally along the line 5A—5A of FIG. 4A.
Figure 5B:
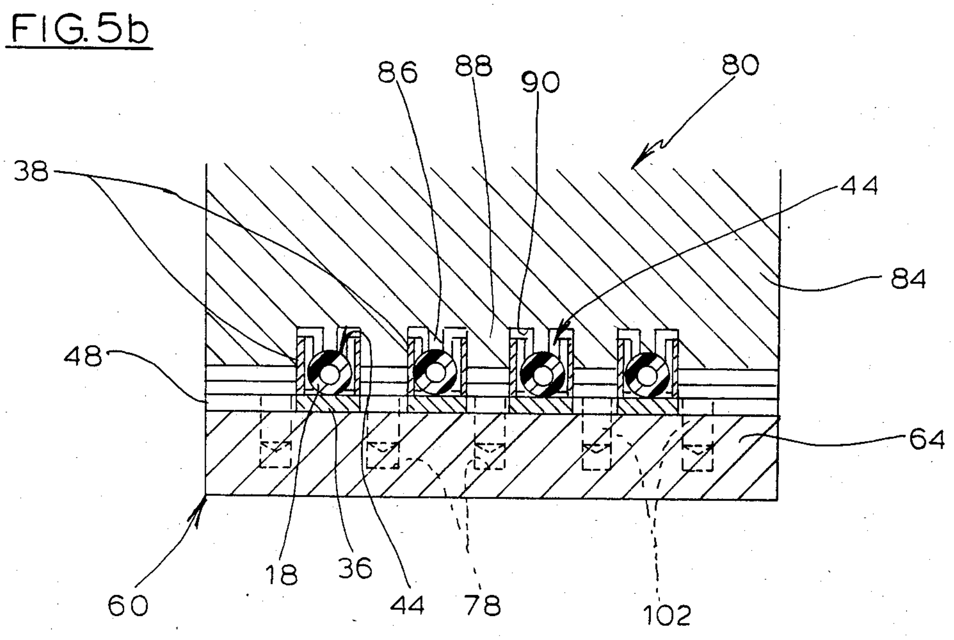
FIG. 5B is a sectional view taken generally along the line 5B—5B of the FIG. 4B.

Looking at FIGS. 4A and 5A, the termination assembly is seen to include a termination head 84 which is a unitary member extending across the entire termination assembly 80 and is moveable therewith. Termination head 84 has a plurality of depending stuffer blades 86 which are adapted to engage the respective conductors and push them into their respective insulation displacement slots 44 when the termination assembly 80 is moved from its first position (FIG. 4A) to its second position (FIG. 4B). A depending wall support portion 88 is formed on both sides of each blade 86. A recess 90 is formed between each blade 86 and terminal wall support portion 88. When the termination assembly 80 is moved from its first position to its second position the walls 40 of the C-shaped members 38 are received in recesses 90 so that the terminal wall support portions 88 are disposed immediately adjacent the outside of the terminal walls as is best seen in FIG. 5B. In this position, the terminal wall support portions 88 laterally brace the terminal walls 40 to prevent the walls from moving outwardly away from each other during the termination operation.

As best seen in FIGS. 4A and 4B, the termination assembly 80 also includes a pair of crimp punches 92 and 94, one mounted on each side of the termination head 84 for movement therewith. Crimp punch 92 is adapted to crimp strain relief wings 46 on the second connector 16 which is received in nest 62. Crimp punch 94 is adapted to crimp the strain relief wings 46 on the terminals 32 received in the first connector 14 received in nest 60. Because punches 92 and 94 are mounted for movement with the termination head 84, they perform their crimping operation simultaneously with the conductor termination operation when the termination assembly 80 is moved from the first position to the second position.

One of the continuing problems of mass terminating a plurality of conductor ends 18 to conductor engaging portions of terminals is the alignment of the conductor ends with said conductor engaging portions. To this end, the termination assembly 80 includes two spring loaded pilot members 96 and 98, each having a plurality of depending pilot posts 100 and 102, respectively. The pilot members 96 and 98 are mounted on the termination assembly 80, one on each side of crimp punch 92 and 94, respectively.

Pilot posts 100 are adapted to be received in pilot recesses 76 of the first connector nest 60 and pilot recesses 78 of the second connector 62. Pilot posts 102 are adapted to be received in pilot recesses 78 of the first connector nest 60 and pilot recesses 76 of the second connector nest 62.

Figure 6E:
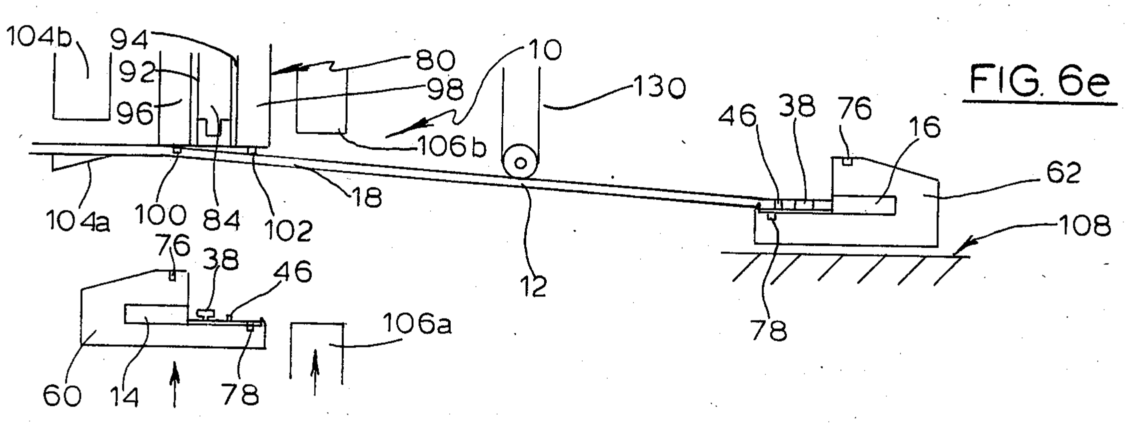

Both pilot members 96 and 98 are moveable with respect to the termination head 84 and crimp punches 92 and 94. After pilot posts 100 or 102 are received in the pilot recesses 76 formed in the ceiling 68 of the connector nests 60 and 62, respectively, and the termination assembly 80 and nests 60 and 62 are moved to their second position, the pilot member 96 or 98 is retracted and biased against the ceiling 68 so that the termination head 84 and crimp punches 92 and 94 can be moved further toward the floor 64 of nests 60 and 62. This is best illustrated with respect to the first nest 60 in FIGS. 4A and 4B. This is also shown schematically in FIG. 6C with respect to the second nest 62.

Separate conductor ends 18 are received between depending posts 100 when the second nest 62 or first nest 60 is at the termination station. Pilot posts 102 receive conductors 18 therebetween only when the first nest 60 is at the termination station 10. By so positioning the conductors 18 between posts 100 and 102, the conductor ends 18 are maintained in their proper spaced relationship. Accordingly, when the posts 100 and/or 102 are received in the respective recesses 76 or 78, each conductor end 18 is captured therebetween. An example of this is illustrated in FIGS. 5A and 5B.

In addition to aligning the conductors 18, the receipt of posts 100 and 102 into recesses 78 of the second nest 62 and 78 of the first nest 60, respectively, serve to align and maintain the position of the terminals 32 with respect to the termination head 84. This is accomplished by virtue of the pilot holes 50 already being aligned with recesses 78 formed in the floor 64 of each nest 60 and 62. Thus when posts 100 and 102 are received in the floor recesses 78 of the second nest 62 and the first nest 60, respectively, the insulation displacement slots 44 are positively positioned with respect to the termination head 84 and the conductor ends 18.

Adjacent the termination assembly 80 and on either side thereof, are two clamping means. One clamping means is located between the termination assembly 80 and the conductor source (not shown) and includes a lower stationary gripping member 104*a* and a moveable upper gripping member 104*b*. The top surface of stationary lower gripper 104*a* defines a conductor supporting surface.

The other clamping means is mounted on the other side of the termination assembly 80 and has a moveable lower gripping member 106*a* which is moveable with the first connector nest 60 and whose top gripping surface is aligned with the floor 64 of nest 60. The top gripping member 106*b* moves up and down with the termination assembly 80. The gripping members 106*a* and 106*b* move together to hold the cable 12 when the first connector 14 is being terminated.

IV. MOVING MEANS

Looking at FIG. 1, the machine of the present invention performs more functions than that effected at the termination station 10. There are functions also performed upstream (i.e., to the left of the termination station) and downstream (i.e., to the right of the termination station).

The termination station 10 is but one location on the machine which performs a plurality of or stream of operations on connector 14. Spaced from and parallel to this stream of functions are the same operations which are performed on the other connector 16. One location on the other side is a second station, generally designated 108, which initially supports connector 16 when it is first positioned in nest 62.

It is found to be desirable to perform all of the termination operations at the one termination station 10. Therefore, it is necessary to move the second connector 16 which is initially received in nest 62 from the second station 108 to the termination station 10. This is accomplished by means of a shuttle assembly, generally designated 110, which includes a support member 112 on which the second connector nest 62 is mounted. Support member 112 is mounted for up and down movement relative to a second member 114 which in turn is slidable along a stationary rail assembly 116 which extends between the second station 108 and the termination station 10.

Looking at the termination station 10, the second connector nest 62 has a support member 118 which is connected by virtue of linkage assembly 120 to actuation means (not shown). A shelf portion 122 extends from the linkage assembly 120 which is adapted to engage the second nest support member 112 when it is moved to the termination station 10. Linkage assembly provides up and down movement to both the connector nests 60 and 62.

Two parallel spaced apart feed tracks 124 and 126 are mounted immediately downstream of the termination station and second station 108, respectively. The tracks 124 and 126 provide support surfaces for the connectors 14 and 16, respectively, after termination as they are directed to other stations wherein other operations are performed.

V. OPERATION

Turning now to FIGS. 6A–6H, the machine operation is illustrated.

Looking at FIG. 6A, partially preloaded connector 14 has been moved to connector nest 60 at the termination station 10 while partially preloaded connectors 16 has been moved to connector nest 62 at the second station 108. The grippers 104*a* and 104*b* are holding the cable ends 18 immediately underneath pilot member 96. Gripper members 106*a* and 106*b* are open.

Connector nests 62 is then moved to the termination station 10 as is shown in FIG. 6B. This is accomplished by accuating the shuttle assembly 110 so that member 114 slides and the rail assembly 116. In order to accommodate connector nest 62 at the termination station 10, connector nest 60 is moved downwardly by virtue of actuating the linkage 120. In addition, termination assembly 80 is moved toward the conductor source a distance such that the ends of conductors 18 now underlie the termination head 84. The relative position of the termination assembly 80 with respect to connector nests 62 as shown in FIG. 6B defines the first position with respect to nest 62.

Connector 16 is then mass terminated as is shown in FIG. 6C which defines the second position relative to the connector nest 62 and termination assembly 80. The floor 64 of nest 62 acts as a conductor supporting surface. The termination operation is accomplished by actuating the linkage 120 so that shelf 122 pushes upwardly on the support member 112 so that the nest 62 is forced up towards the termination assembly 80. When this occurs, pilot posts 102 are received within pilot recesses 76 and, upon further upward movement, pilot member 98 is retracted relative to the remainder of the termination assembly 80. As the nest 62 moves further upwardly toward the termination assembly 80, the blades 86 engage their respective conductors 18 and pushes them into their respective insulation displacement slots 44 while crimp punch 92 simultaneously forms the strain relief wings 46 about the insulation of conductor 18. During the termination, the pilot posts 100 are received in recesses 78 through the pilot holes 50 thereby assuring that the conductors 18, termination head 84 and insulation displacement slots 44 are all aligned with respect to one another.

The entire termination assembly 80 is raised with respect to nest 62 preparatory to its movement back to the second station 108 as is shown in FIG. 6D. When this occurs, the upper gripper member 104*b* is raised thereby freeing cable 12 for movement of the connector nests 62 and the attached cable. When the nest 62 is moved to the second station 108, a given length of cable is dereeled an amount equal to the distance between stations 10 and 108.

After the connector nest 62 is moved to the second station 108 dereeling the cable 12 therewith, an additional length of wire may be dereeled by actuating a looper assembly 130 which imparts a force transverse to the length of the cable downwardly in a manner which is well known in the art. Immediately thereafter, the termination assembly 80 is lowered so that pilot posts 100 and 102 are received within the notched portion of cable 12.

Figure 6F:
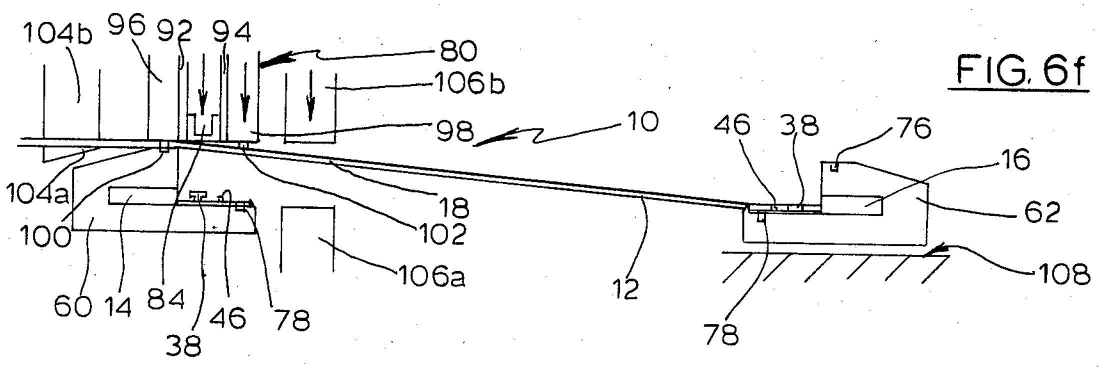

Connector nest 60 is then moved upwardly so that pilot posts 100 received within pilot recesses 76 defining the first position between said first connector nest 60 and the termination assembly 80 as is shown in FIG. 6F. When this occurs, upper gripper 104*b* is lowered to hold the cable between the termination assembly 80 and the conductor source.

Figure 6G:
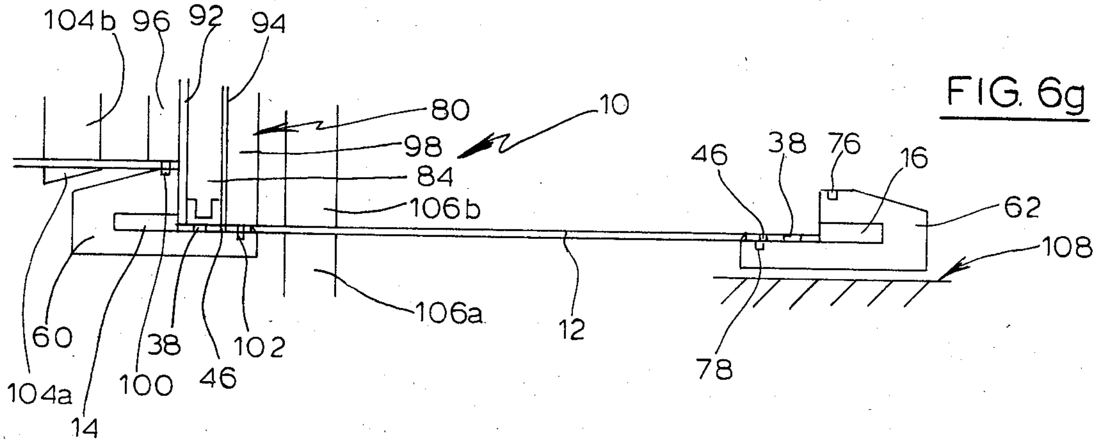

In the next step shown in FIG. 6G, the termination assembly 80 is actuated so that the termination head 84, crimp punches 92 and 94 and pilot member 98 are simultaneously lowered. The other pilot member 96 remains biased against the ceiling 68 in a retracted spring loaded condition. The termination head 84, and, in particular, the blades 86, push the conductors 18 into their respective insulation displacement slots 44 while crimp punch 94 simultaneously forms the strain relief wings 46 about the insulation of the conductors 18. As crimp punch 92 travels past the free end of the flat portion 72 of ceiling 68, it cooperates with the free edge thereof to shear cable 12 at the correct length. At the same time gripper member 106*a* is raised to grip cable 12 against upper gripper member 106*b*. FIG. 6G defines the second or terminating position of termination assembly 80 with respect to the first connector nest 60.

Figure 6H:
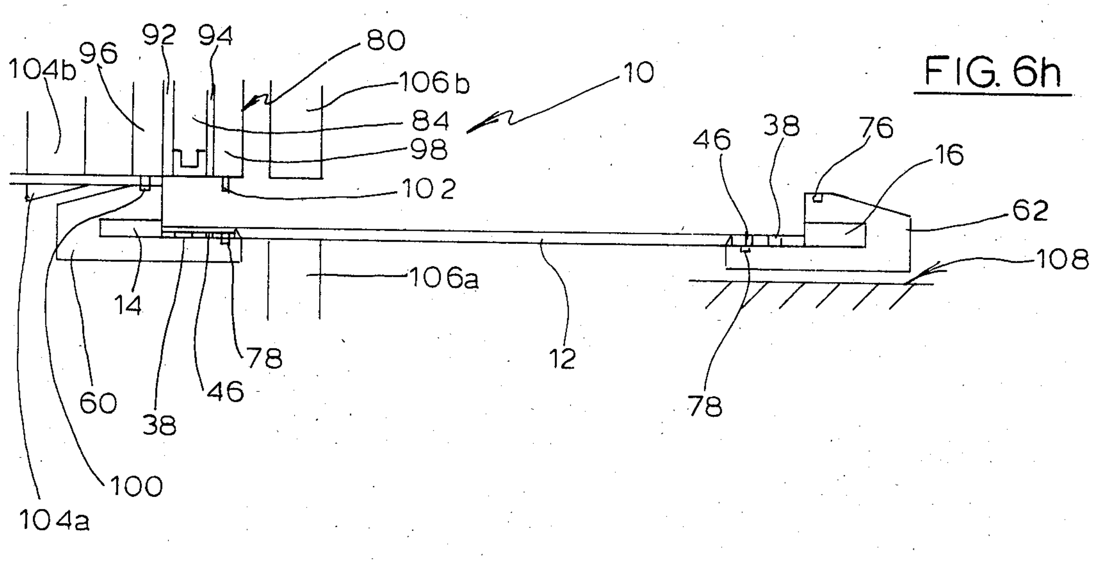

The entire termination assembly 80 and gripper member 106*b* are raised to the same configuration as was described with respect to FIG. 6F. At this point in the operation, both ends of the cable 12 have been terminated to partially preloaded connectors 14 and 16 as is shown in FIG. 6H. Suitable means are then actuated to move the terminated cable downstream on feed tracks 124 and 126 where the carrier stip is removed and the terminals 32 and fully inserted into their respective housings 24.

It is significant that during the entire operation at the termination station 10, the cable coming from the conductor source is always held at the same relative height. This aids in the correct alignment and measurement of the cable during the termination operation.

We claim:

1. In a machine for fabricating an electrical harness including a connector electrically connected to a plurality of conductors, said connector having a housing with a plurality of terminal receiving cavities therein and a plurality of terminals mounted in said cavities, each terminal having a conductor engaging portion and being moveable between a partially preloaded position relative to the housing wherein the conductor engaging portions extend out of the housing to an inserted position wherein said terminals are fully seated within their respective cavities, said machine including a connector nest for holding and positioning a partially preloaded connector having a floor defining a support surface for said connector, a termination station whereat a partially preloaded connector is electrically connected to a plurality of wire conductors, a wire conductor source for storing conductors and guiding them to the termination station, wire clamping means for releaseably holding the conductors at the termination station, a termination assembly including a termination head for simultaneously attaching the conductors to the terminal conductor engaging portions, said connector nest and termination assembly being mounted for up and down relative movement between a first position wherein said nest is spaced from said termination assembly and a second position wherein said conductors and conductor engaging portions are terminated, means for feeding a predetermined length of conductors, cutting means for cutting the conductors at the predetermined length after being terminated, and terminal insertion means for inserting the terminals to their inserted position, the improvement comprising:

said termination assembly including pilot means adjacent said head and cooperating with said conductors and nest for accurately positioning the termination head, conductors and conductor engaging portions with respect to one another when the nest and termination assembly are in their second position.

2. The machine of claim 1 wherein said pilot means has an end having a plurality of spaced-apart depending pilot posts and said nest having a plurality of spaced-apart pilot recesses adapted to receive said posts, said posts being positioned such that each conductor is received between adjacent posts to maintain the proper spacing therebetween.

3. The machine of claim 2 wherein sad pilot recesses are formed in the floor wherein said floor defines a conductor supporting surface.

4. The machine of claim 3 wherein said partially preloaded terminals include a carrier strip connected at their free ends to maintain the correct spaced relationship between adjacent terminals having pilot holes formed therein between each of the terminals, said pilot receses and pilot holes being aligned so that the posts are received into said pilot recesses through said pilot holes.

5. The machine of claim 4 including means to remove the carrier strip after the wire conductors are terminated.

6. The machine of claim 1 wherein each terminal includes a crimpable strain relief portion adjacent the conductor engaging portion, said termination assembly including crimping means adjacent for said head crimping said strain relief portion around the conductors while they are terminated.

7. The machine of claim 1 wherein said conductors are insulated and said conductors engaging portion includes an insulation displacement slot for receiving an insulated conductor therein, said termination head includes a plurality of blades for moving the wire conductors laterally of their longitudinal axes into their respective insulation displacement slots, whereby said slot displaces the insulation and electrically contacts said conductors.

8. The machine of claim 7 wherein said conductors forms a unitary ribbon cable assembly having insulative webs therebetween and wherein said machine further includes a notcher assembly mounted between said conductor source and said termination station to remove a portion of said webs between adjacent conductors.

9. The machine of claim 1 wherein the connector includes detent means to locate and position said terminals in their preloaded position and their inserted position.

10. The machine of claim 9 wherein said detent means includes spaced apart first and second windows formed in each cavity and a locking lance formed on each terminal which cooperates with the first window when in the preloaded position and the second window when in the inserted position.

11. The machine of claim 1 including a second station remote from the termination station, said conductor feeding means includes nest support means extending from said termination station to said second station, said nest being mounted on said support means for movement between the two stations and means for moving said nest from the termination station to said second station after the conductors have been terminated, whereby the conductors are fed a distance equal to the distance between the two stations.

12. The machine of claim 11 including means for forming a loop in said conductors which extend between said two stations in order to provide a length of greater distance than between said two stations.

13. The machine of claim 12 wherein said cutting means is mounted on said termination head assembly and is moveable to engage edge means at the termination station when said nest is at the second station.

14. The machine of claim 1 wherein the termination assembly is stationary when said nest and termination assembly are moved to their second position.

15. In a machine for fabricating an electrical harness including a connector electrically connected to a plurality of insulated wire conductors, said connector having a housing with a plurality of terminal receiving cavities therein and a plurality of terminals mounted in said cavities, each terminal having an wire engaging portion in the form of an insulation displacement slot and being moveable between a partially preloaded position relative to the housing wherein the wire engaging portions extend out of the housing to an inserted position wherein said terminals are fully seated within their respective cavities, said machine including a connector nest for holding and positioning a partially preloaded connector having a floor defining a support surface for said connector, a termination station whereat a partially preloaded connector is electrically connected to a plurality of wire conductors, a wire conductor source for storing wire conductors and guiding them to the termination station, wire clamping means for releaseably holding the wire conductors at the termination station, a termination assembly including a termination head with a plurality of wire stuffing blades, said termination assembly being moveable between a normal position wherein the blades are immediately over the wire conductors and wire slots downwardly to a terminating position simultaneously pushing the wire conductors into their respective wire slots, said connector nest and termination assembly being mounted for up and down relative movement between a first position wherein said nest is spaced from said termination assembly and a second position wherein said conductors and wire slots are terminated, means for feeding a predetermined length of wire conductors, cutting means for cutting the wire conductors at the predetermined length after being terminated, and terminal insertion means for inserting the terminals to their inserted position, the improvement comprising:

said wire engaging portion including a base with two upstanding opposed C-shaped members each having a wall defining the bight parallel and spaced from each other, each wall having an inwardly directed plate at both ends, the plates at each same end of the walls being spaced apart a distance less than the width of the conductor of the insulated wire so as to define two axially spaced insulation displacement slots; and said termination head including wall support means mounted on both sides of each blade, and a space between each blade and wall support means for receiving a terminal wall therein so that the wall support means are position immediately adjacent the outside of the terminal walls when said termination head is the terminating their second position; whereby, when said termination head is moved to its terminating position, the wall support means laterally brace the terminal walls to prevent the terminal walls from moving outwardly away from each other.

16. The machine of claim 15 wherein each terminal includes a crimpable strain relief portion adjacent the wire slot, said termination assembly including a crimp punch in front of each wire stuffing blade for crimping the strain relief portion around the wire conductors while they are terminated.

17. The machine of claim 16 wherein said termination assembly includes pilot means adjacent said head and cooperating with said wire conductors and nest for accurately positioning the termination head, wire conductors and wire engaging portions with respect to one another when the nest and termination assembly are in their second position.

18. The machine of claim 17 wherein said pilot means has an end having a plurality of spaced-apart depending posts and said nest having a plurality of spaced-apart pilot recesses adapted to receive said posts, said posts being positioned such that each wire conductor is received between adjacent posts to maintain the proper spacing therebetween.

19. The machine of claim 18 wherein said pilot recesses are formed in the floor wherein said floor defines a conductor supporting surface.

20. The machine of claim 19 wherein said partially preloaded terminals include a carrier strip connected at their free ends to maintain the correct spaced relationship between adjacent terminals having pilot holes formed therein between each of the terminals, said pilot recesses and pilot holes being aligned so that the posts are received into said pilot recesses through said pilot holes.

21. The machine of claim 20 including means to remove the carrier strip after the wire conductors are terminated.

22. The machine of claim 15 wherein said blades and wall support means are integrally formed on an edge of a unitary member.

23. In a machine for fabricating an electrical harness including first and second connectors, one connector electrically connected to each end of a plurality of conductors, each connector having a housing with a plurality of terminal receiving cavities therein and a plurality of terminals mounted in said cavities, each terminal having a conductor engaging portion and being moveable between a partially preloaded position relative to the housing wherein the conductor engaging portions extend out of the housing to an inserted position wherein said terminals are fully seated within their respective cavities, said machine including first and second oppositely facing connector nests for holding and positioning the first and second partially preloaded connectors, respectively, each nest having a floor defining a support surface for said connector, a termination station whereat a partially preloaded connector is electrically connected to a plurality of conductors and whereat the first nest is initially located, a second station remote from said termination station whereat the second nest is initially located, a wire conductor source for storing conductors and guiding them to the termination station, wire clamping means for releaseably holding the conductors at the termination station, a termination assembly including a termination head for simultaneously attaching the conductors to the terminal conductor engaging portions, each connector nest and termination assembly being mounted for up and down relative movement between a first position wherein said nest is spaced from said termination assembly and a second position wherein said conductors and conductor engaging portions are terminated, means for feeding a predetermined length of conductors, cutting means for cutting the conductors at the predetermined length after being terminated, terminal insertion means for inserting the terminals to their inserted position, and control means for moving the second nest to the termination station, lowering the first nest so as to accommodate the second nest, moving the second nest from its first position to its second position, terminating one end of the conductors to the second partially preloaded connector, moving the second nest back to the second station pulling a length of conductors therewith, moving the first nest to its second position, terminating the other end of the conductors to the first partially preloaded connector of the first connector, and cutting the conductors during termination, the improvement comprising:

said termination assembly including first and second pilot means on the front and rear sides of said head and separately cooperating with each end of said conductors and each nest individually for accurately positioning the termination head, conductors and conductor engaging portions with respect to one another when each nest and the termination assembly are in the second position.

24. The machine of claim 23 wherein each pilot means has an end having a plurality of spaced-apart depending posts and each nest having two sets of spaced-apart pilot recesses adapted to receive said posts, said posts being positioned such that each conductor is received between adjacent posts to maintain the proper spacing therebetween.

25. The machine of claim 24 wherein each nest includes a ceiling spaced from said floor to define a housing receiving recess therebetween so that said terminal wire engaging portions extend out of the ceiling when the terminals are in their preloaded position, one set of pilot recesses are formed in the top surface of the ceiling and the other set of said pilot recesses are formed in the top surface of the floor, the top surface of the floor of the second nest defines a conductor supporting surface and the top surface of the ceiling of the first nest defines a conductor supporting surface, respectively, with the termination assembly and each nest are in their second position.

26. The machine of claim 25 wherein said partially preloaded terminals include a carrier strip connected at their free ends to maintain the correct spaced relationship between adjacent terminals having pilot holes formed therein between each of the terminals, said pilot recesses and pilot holes being aligned so that the posts of the first pilot means are received into said pilot recesses formed in the floor of the first nest through said pilot holes and the posts of the second pilot means are received into said pilot recesses formed in the floor of the second nest through said pilot holes.

27. The machine of claim 26 including means to remove the carrier strip after the wire conductors are terminated.

28. The machine of claim 25 wherein each pilot means is spring mounted for up and down reciprocal movement parallel to said head between a normal position wherein a set of pilot posts are first received in the pilot recesses of the ceiling and a spring loaded retracted position biased against the ceiling as the termination assembly and each nest are moved together.

29. The machine of claim 23 wherein said conductors are insulated;

said conductor engaging portion includes a base with two upstanding opposed C-shaped members each having a wall parallel and spaced from each other, defining the bight, each wall having an inwardly directed plate at both ends, the plates at each same end of the walls being spaced apart a distance less than the conductor core so as to define two axially spaced insulation displacement slots; and said termination head includes a plurality of stuffing blades, wall support means mounted on both sides of each blade, and a space between each blade and wall support means for receiving a terminal wall therein so that the wall support means are positioned immediately adjacent the outside of the terminal walls when said termination head is in the termination position;

whereby, when said termination head is moved to its terminating position, the wall support means laterally brace the terminal walls to prevent the terminal walls from moving outwardly away from each other.

30. The machine of claim 29 wherein each terminal includes a crimpable strain relief portion adjacent the conductor slot, said termination assembly including a crimp punch in front of each stuffing blade for crimping the strain relief portion around the insulated conductors while they are terminated.

31. The machine of claim 30 wherein said cutting means includes an edge of the ceiling of the first nest and an edge on the crimp punch whereby the sliding movement of the crimp punch past the edge of the ceiling of the first nest when the first nest and termination assembly are moved to their second position shears the conductors.

32. The machine of claim 23 wherein said conductors forms a unitary ribbon cable assembly having insulative webs therebetween and wherein said machine further includes a notcher assembly mounted between said conductor source and said termination station to remove a portion of said webs between adjacent conductors.

33. The machine of claim 23 wherein the connector includes detent means to locate and position said terminals in their preloaded position and their inserted position.

34. The machine of claim 33 wherein said detent means includes spaced apart first and second windows formed in each cavity and a locking lance formed on each terminal which cooperates with the first window when in the preloaded position and the second window when in the inserted position.

35. The machine of claim 23 including means for forming a loop in said conductors which extend between said two stations in order to provide a length of greater distance than between said two stations.

36. The machine of claim 30 wherein said termination assembly is stationary when said second nest and termination assembly are moved to their second position.

37. The machine of claim 23 or 31 wherein said first nest is stationary when said first nest and termination assembly are moved to their second position.

* * * * *